United States Patent Office 2,719,174
Patented Sept. 27, 1955

2,719,174
METHOD OF PREPARATION OF TETRAALKYLGUANYLUREAS

Ingenuin Hechenbleikner, Stamford, Conn., assignor to American Cyanamid Company, New York, N. Y., a corporation of Maine No Drawing. Application August 11, 1953,
Serial No. 373,683

4 Claims. (Cl. 260—553)

The present invention relates to new and useful substituted guanylurea compounds and methods of preparing them.

These new compounds are the tetraalkylguanylureas which conform to the formula

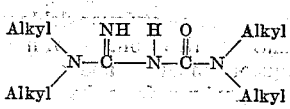

wherein alkyl stands for both the straight chain and branched chain, the saturated and unsaturated, and the cycloalkyl radicals. Typical examples of these radicals are methyl, ethyl, n-propyl, isopropyl, n-butyl, isobutyl, sec.-amyl, n-hexyl, 2-ethylhexyl, n-octyl, decyl, dodecyl, cetyl, octadecyl, ceryl, allyl, 2-methylallyl and cyclohexyl.

The above new compounds may be readily prepared by reacting a tetraalkylguanylchloroformamidine hydrochloride with an alkali-forming metal hydroxide in an aqueous medium.

Methods of preparing the tetraalkylguanylchloroformamidine hydrochlorides employed in the present process are disclosed in my copending application, Serial No. 358,549, filed May 29, 1953. For example, tetraethylguanylchloroformamidine hydrochloride is formed by reacting diethyl cyanamide with hydrogen chloride in equimolecular proportions at a temperature within the range of from 60° to 150° C. The reaction may be illustrated as follows:

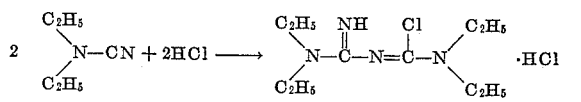

The term "alkali-forming metal hydroxide" as used in this specification and in the appended claims is intended to cover the alkali metal and the alkaline earth metal hydroxides.

The tetraalkylguanylureas of the present invention are readily formed by adding an alkali-forming metal hydroxide to an aqueous solution of a tetraalkylguanylchloroformamidine hydrochloride. The reaction takes place at room temperature, and the tetraalkylguanylurea is easily separated from the reaction mixture. The general reaction, employing sodium hydroxide as the basic reactant, may be illustrated as follows:

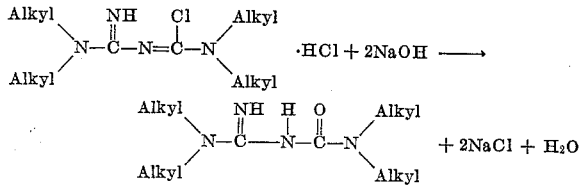

The invention is further illustrated, but not limited, by the following examples:

EXAMPLE 1
1,1,5,5-tetramethylguanylurea

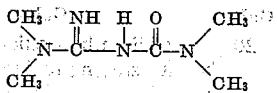

A solution of 120 g. of sodium hydroxide in 500 cc. of water was added slowly with stirring to 213 g. of tetramethylguanylchloroformamidine hydrochloride (a colorless crystalline compound melting at 233–235° C.) in 1000 cc. of water. After standing at room temperature for one hour, the reaction mixture was extracted with three 250 cc. portions of benzene. Evaporation of the benzene solution gave 160 g. (95% yield) of the tetramethylguanylurea melting at 90–92° C. After recrystallization from benzene the white crystalline product melted at 93–94° C.

Analysis.—Calc'd. for $C_6H_{14}N_4O$: N, 35.44. Found: N, 35.37.

EXAMPLE 2
1,1,5,5-tetraethylguanylurea

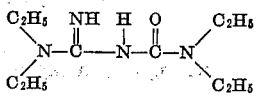

A suspension of 74 g. of calcium hydroxide in 500 cc. of water was added with stirring to 269 g. of tetraethylguanylchloroformamidine hydrochloride (a colorless crystalline compound melting at 35–40° C.) in 1000 cc. of water. After standing at room temperature for one hour, the reaction mixture was filtered to recover the precipitated tetraethylguanylurea. Two recrystallizations from cyclohexane gave 170 g. of the product melting at 78–80° C.

Analysis.—Calc'd. for $C_{10}H_{22}N_4O$: N, 26.16. Found: N, 26.38.

EXAMPLE 3
1,1,5,5-tetraisopropylguanylurea

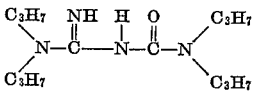

A solution of 100 g. of sodium hydroxide in 400 cc. of water was added slowly with stirring to 347 g. of tetraisopropylguanylchloroformamidine hydrochloride in 1000 cc. of water at room temperature (25° C.). After standing for one-half hour, the reaction mixture was filtered to recover the precipitated tetraisopropylguanylurea. Recrystallization from aqueous methanol (equal parts by volume of methanol and water) gave 200 g. of the product melting at 135–136° C.

Anaylsis. Calc'd. for $C_{14}H_{30}N_4O$: N, 20.74. Found: N, 20.76.

EXAMPLE 4
1,1,5,5-tetra-n-octylguanylurea

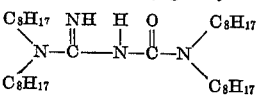

A solution of 140 g. of potassium hydroxide (85%) in 500 cc. of water was added slowly with stirring to 291 g. of tetra-n-octylguanylchloroformamidine hydrochloride in 1500 cc. of water. After standing at room temperature for one hour the tetra-n-octylguanylurea, a colorless oily liquid, was decanted from the reaction mixture. 237 g. of the product was obtained. Titration in alcohol with 0.5 N HCl gave a neutralization equivalent of 240 (calc'd., 237).

EXAMPLE 5

*1,1,5,5-tetradodecylguanylurea*

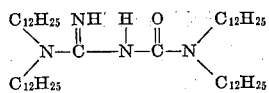

A solution of 120 g. of sodium hydroxide in 500 cc. of water was added slowly with stirring to 515 g. of tetradodecylguanylchloroformamidine hydrochloride in 2500 cc. of water at room temperature. The tetradodecylguanylurea, a colorless oily liquid, was removed from the reaction mixture by decantation. After standing for several hours the product solidified to a waxy solid weighing 460 g. Titration in alcohol with 0.5 N HCl gave a neutralization equivalent of 465 (calc'd., 461).

The compounds of the present invention are adapted for various uses, more particularly as intermediates in the production of insecticidal and fungicidal compositions, as collectors in the froth flotation of ores, and as assistants for the modification of textile fibers.

While the invention has been described with particular reference to specific embodiments, it is to be understood that it is not to be limited thereto but is to be construed broadly and restricted solely by the scope of the appended claims.

I claim:

1. A method of preparing a tetraalkylguanylurea of the formula

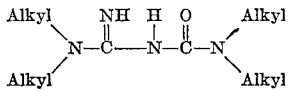

which comprises bringing a tetraalkylguanylchloroformamidine hydrochloride of the formula

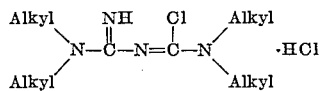

into reactive contact with a metal hydroxide chosen from the group consisting of alkali metal hydroxides and alkaline earth metal hydroxides in an aqueous medium, and recovering the thus-formed tetraalkylguanylurea from the reaction mixture.

2. A method of preparing tetramethylguanylurea which comprises bringing tetramethylguanylchloroformamidine hydrochloride into reactive contact with sodium hydroxide in an aqueous medium, and recovering the thus-formed tetramethylguanylurea from the reaction mixture.

3. A method of preparing tetraethylguanylurea which comprises bringing tetraethylguanylchloroformamidine hydrochloride into reactive contact with calicum hydroxide in an aqueous medium, and recovering the thus-formed tetraethylguanylurea from the reaction mixture.

4. A method of preparing tetraoctylguanylurea which comprises bringing tetraoctylguanylchloroformamidine hydrochloride into reactive contact with potassium hydroxide in an aqueous medium, and recovering the thus-formed tetraoctylguanylurea from the reaction mixture.

References Cited in the file of this patent

UNITED STATES PATENTS 2,265,944    Langhorst et al. -------- Dec. 9, 1941